US012607917B2

(12) United States Patent (10) Patent No.: US 12,607,917 B2
Chien et al. (45) Date of Patent: Apr. 21, 2026

(54) PROJECTION DEVICE

(71) Applicant: Coretronic Corporation, Hsin-Chu (TW)

(72) Inventors: Wei-Min Chien, Hsin-Chu (TW); Yen-Ting Lin, Hsin-Chu (TW); Yao-Hung Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 291 days.

(21) Appl. No.: 18/492,799

(22) Filed: Oct. 24, 2023

(65) Prior Publication Data

US 2024/0134256 A1 Apr. 25, 2024
US 2024/0231203 A9 Jul. 11, 2024

(30) Foreign Application Priority Data

Oct. 24, 2022 (CN) .......................... 202211300598.7

(51) Int. Cl.
G03B 21/14 (2006.01)
(52) U.S. Cl.
CPC ................................. G03B 21/145 (2013.01)
(58) Field of Classification Search
CPC ..... G03B 21/145; G03B 21/142; G03B 21/28
See application file for complete search history.

(56) References Cited

U.S. PATENT DOCUMENTS 6,379,012 B1 * 4/2002 Enochs ................ G03B 21/132
353/77
2003/0202160 A1 * 10/2003 Chimura ................ G03B 21/16
353/52

2006/0072080 A1 * 4/2006 Perkins ................... G03B 21/28
348/E5.143
2006/0290897 A1 * 12/2006 Engle ..................... G03B 21/10
348/E5.143
2008/0123062 A1 * 5/2008 Morikuni ............... G02B 13/16
353/98

(Continued)

FOREIGN PATENT DOCUMENTS

CN 106961813 7/2017
CN 209821580 12/2019

(Continued)

OTHER PUBLICATIONS

"Notice of Allowance of related U.S. Appl. No. 18/491,819", issued on Nov. 18, 2025, p. 1-p. 9.

*Primary Examiner* — Bao-Luan Q Le

(74) *Attorney, Agent, or Firm* — JCIPRNET

(57) ABSTRACT

A projection device includes a shell, a lens, two first ribs, two second ribs, and a sliding cover. The shell has a top plate, a left sidewall, and a right sidewall, the top plate is respectively connected to the left sidewall and the right sidewall, and the top plate has an opening. The lens is disposed in the shell and exposed by the opening. The two first ribs are disposed on the top plate, extending directions of the two first ribs are perpendicular to the left sidewall and the right sidewall, and the opening is disposed between the two first ribs. The sliding cover is slidably disposed on the shell for covering the opening. The two second ribs are disposed on a top cover body of the sliding cover, and one of the two second ribs is located between the two first ribs.

10 Claims, 12 Drawing Sheets

(56)                References Cited

U.S. PATENT DOCUMENTS

2008/0198338  A1*   8/2008   Yokote ................... G03B 21/28
                                                              353/101
2011/0188004  A1*   8/2011   Maeda ................... G03B 21/20
                                                              353/43
2011/0188008  A1*   8/2011   Maeda ................... G03B 21/28
                                                              353/85
2013/0010268  A1*   1/2013   Nishima ............... G03B 21/16
                                                              353/52
2020/0041883  A1    2/2020   Chung
2020/0041884  A1    2/2020   Chung
2022/0413371  A1    12/2022  Hou
2023/0236486  A1    7/2023   Tsai
2024/0111207  A1    4/2024   Hou
2024/0134258  A1    4/2024   Chien et al.
2024/0142864  A1    5/2024   Huang

FOREIGN PATENT DOCUMENTS

| CN | 211698565 | 10/2020 |
| TW | I337295   | 2/2011  |
| TW | I440955   | 6/2014  |
| TW | M486786   | 9/2014  |

* cited by examiner

2

28

2121      21211                2823

2

28

2823

2

28

2831

21311    2131

2

28

2831

PROJECTION DEVICE

CROSS-REFERENCE TO RELATED APPLICATION

This application claims the priority benefit of China application serial no. 202211300598.7, filed on Oct. 24, 2022. The entirety of the above-mentioned patent application is hereby incorporated by reference herein and made a part of this specification.

BACKGROUND

Technical Field

The disclosure relates to a projection device, and in particular to a projection device having dustproof effect.

Description of Related Art

A projector is a display technology that projects a large screen through a small-sized image, and this also means that a projector is a small-sized but high-power-consuming electronic product. Therefore, in order to solve the high heat energy generated during projection, a conventional projector 1 uses active cooling design such as fans for heat dissipation requirements, and a shell 11 is provided with openings 12 as air inlets and outlets (as shown in FIG. 1). However, although the openings 12 on the shell 11 can allow the projector 1 to achieve better heat dissipation effect, the openings 12 on the shell 11 also allow external dust to accumulate in the system of the projector 1, especially when the dust accumulates on a projection lens 13, which has a considerable impact on the image quality and brightness of the projector 1.

In light of the above, the current technology has the following unresolved problems:

1. The heat dissipation design without openings leads to poor heat dissipation efficiency of the overall system and overheating problems.
2. No dustproof design for the lens leads to decrease in brightness due to the accumulation of dust on the lens after the projector has been used for a period of time. At the same time, sharpness of the image also becomes blurred due to the problem of dust fall that cannot effectively reflect the light to the preset position.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a projection device having dustproof effect.

A projection device of the disclosure includes a shell, a lens, two first ribs, two second ribs, and a sliding cover. The shell has a top plate, a left sidewall, and a right sidewall, the top plate is respectively connected to the left sidewall and the right sidewall, and the top plate has an opening. The lens is disposed in the shell and exposed by the opening. The two first ribs are disposed on the top plate, extending directions of the two first ribs are perpendicular to the left sidewall and the right sidewall, and the opening is disposed between the two first ribs. The sliding cover is slidably disposed on the shell for covering the opening. The two second ribs are disposed on a top cover body of the sliding cover, and one of the two second ribs is located between the two first ribs. The sliding cover may slide relative to the shell. When the sliding cover is in an open position, the top cover body does not cover the lens; when the sliding cover is in a closed position, the top cover body covers the lens, and the two second ribs bear against the corresponding two first ribs.

In the projection device of the disclosure, the sliding cover is slidably disposed on the shell, and the sliding cover and the shell are provided with ribs corresponding to each other. Therefore, when the lens needs to be used, the sliding cover may be slid along the shell to expose the opening of the top plate of the shell, and the projection device can project images; and when the lens needs not be used, the sliding cover is slid along the shell to cover the opening, and at the same time, the ribs bear against each other to form a closed space surrounding the opening, thereby achieving the effect of preventing dust fall from entering the inside of the shell.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
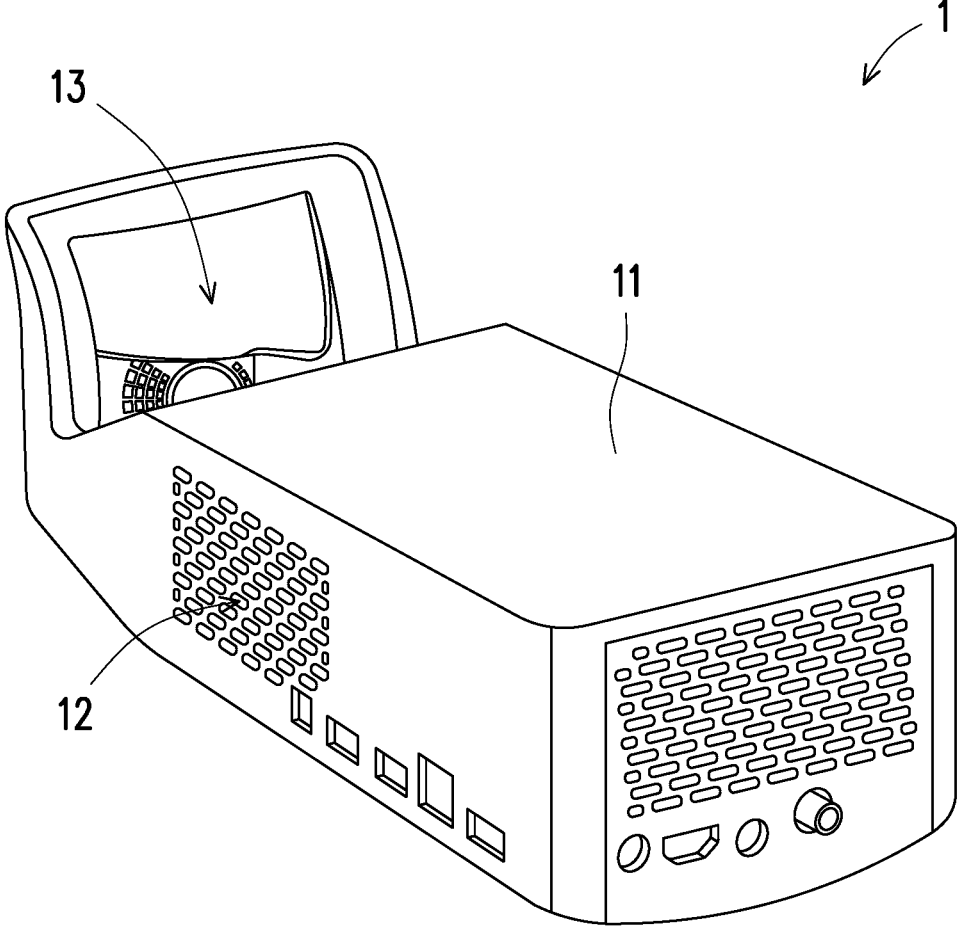
FIG. 1 is a schematic diagram of a conventional projector.
Figure 2:
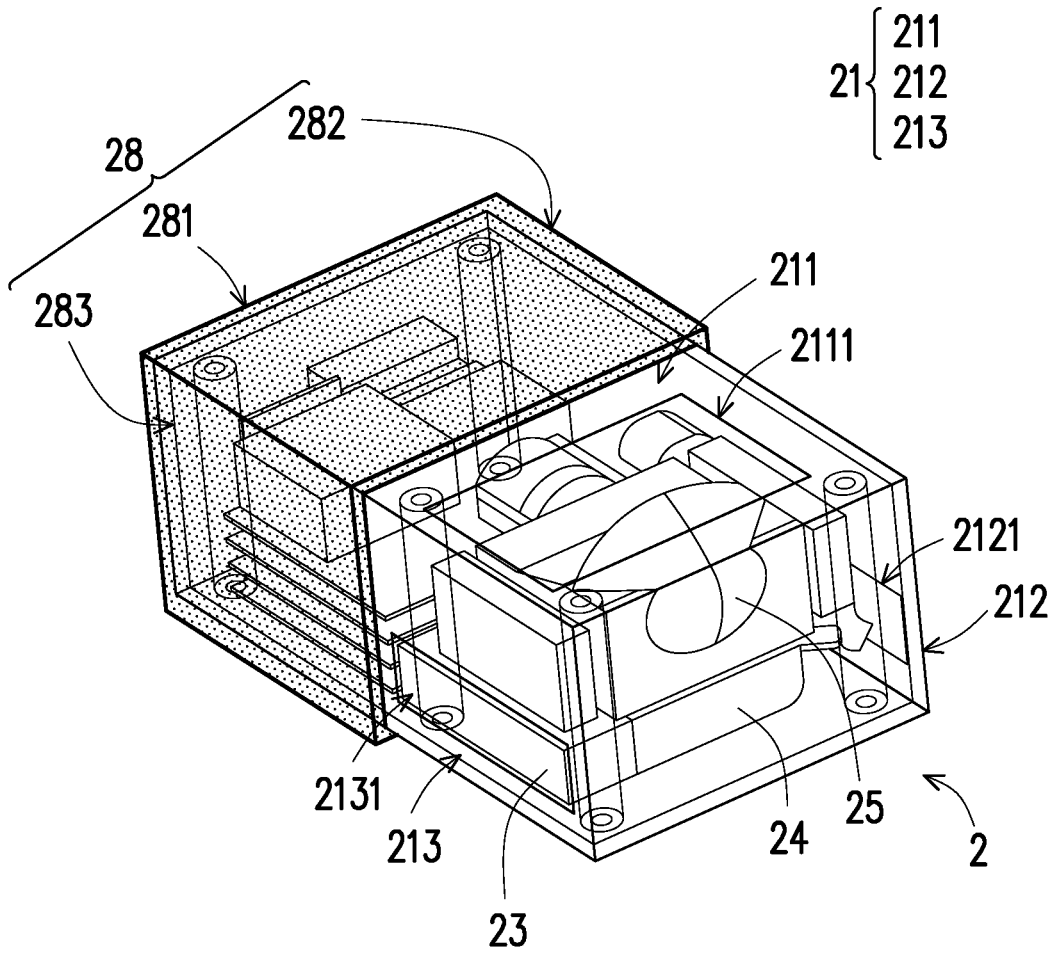
FIG. 2 is a schematic perspective view of a projection device of the disclosure.
Figure 3A:
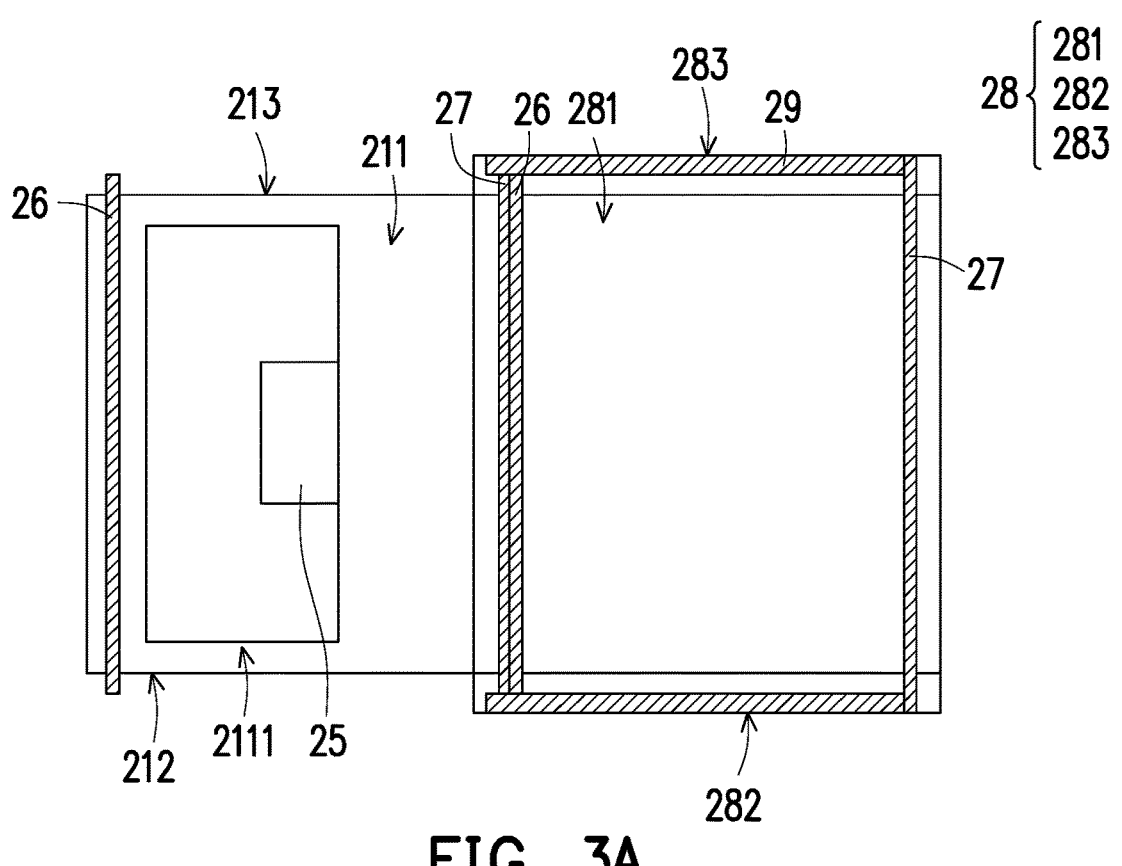
FIG. 3A is a schematic diagram of the projection device of FIG. 2 when the sliding cover is in an open position.
Figure 3B:
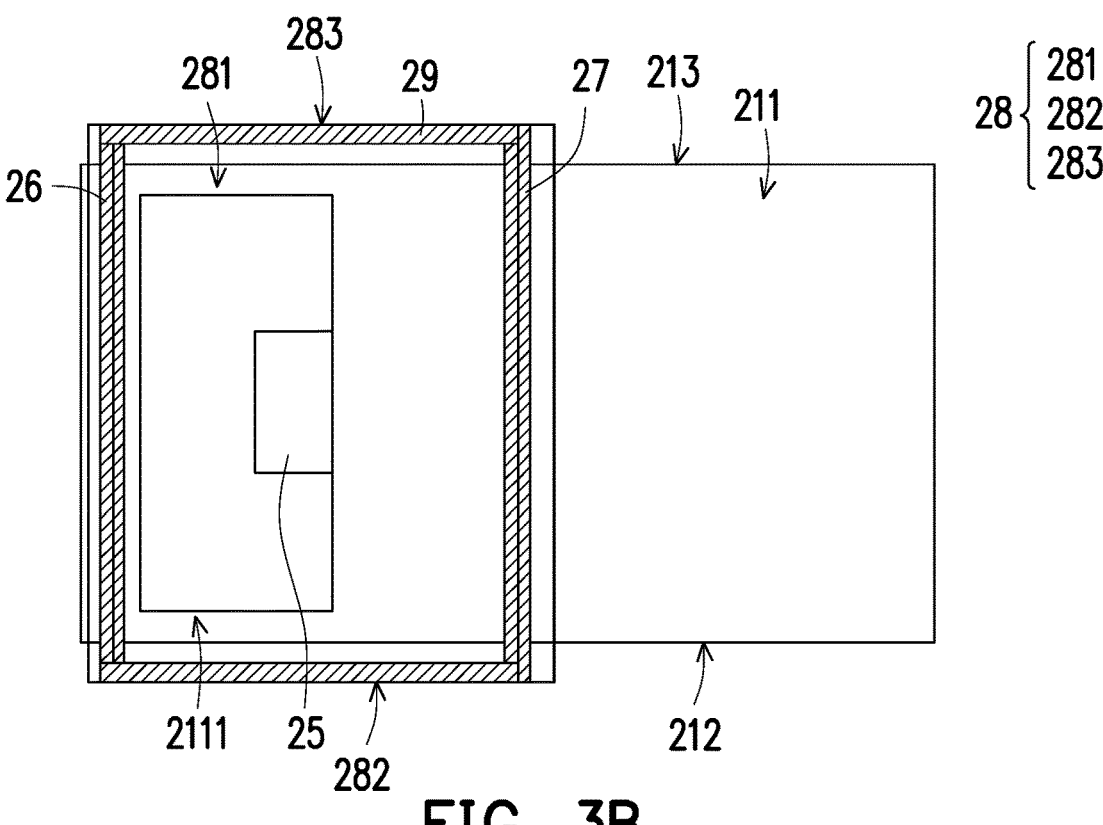
FIG. 3B is a schematic diagram of the projection device of FIG. 3A when the sliding cover is in a closed position.

FIG. 2 is a schematic perspective view of a projection device of the disclosure, FIG. 3A is a schematic diagram of the projection device of FIG. 2 when the sliding cover is in an open position, and FIG. 3B is a schematic diagram of the projection device of FIG. 3A when the sliding cover is in a closed position.

Please refer to FIGS. 2, 3A, and 3B at the same time. A projection device 2 of the embodiment includes a shell 21, a light source module 22, a light source heat dissipation module 23, a fan module 24, a lens 25, two first ribs 26, two second ribs 27, and a sliding cover 28. The light source module 22, the light source heat dissipation module 23, the fan module 24, and the lens 25 are all disposed in the shell 21. A heat pipe (not shown) is connected between the light source module 22 and the light source heat dissipation module 23, so that the heat emitted by the light source module 22 during operation can be further dissipated through the light source heat dissipation module 23. The fan module 24 is disposed adjacent to the light source heat dissipation module 23.

The shell 21 has a top plate 211, a left sidewall 212, and a right sidewall 213, the top plate 211 is respectively connected to the left sidewall 212 and the right sidewall 213, and the top plate 211 has an opening 2111. The lens 25 is disposed in the shell 21 and exposed by the opening 2111. The two first ribs 26 are disposed on the top plate 211, the extending directions of the two first ribs 26 are perpendicular to the left sidewall 212 and the right sidewall 213, and the opening 2111 is disposed between the two first ribs 26. The sliding cover 28 is slidably disposed on the shell 21, and the sliding cover 28 may be configured to cover the opening 2111. The two second ribs 27 are disposed on a top cover body 281 of the sliding cover 28, and one of the two second ribs 27 is located between the two first ribs 26. To be precise, the second ribs 27 are located on the surface of the top cover body 281 facing the top plate 211.

The above-mentioned sliding cover 28 may slide relative to the shell 21. When the sliding cover 28 is in the open position, the top cover body 281 does not cover the lens 25, so the lens 25 is exposed by the opening 2111 and can project images; and when the sliding cover 28 is in the closed position, the top cover body 281 covers the lens 25, and the two second ribs 27 bear against the corresponding two first ribs 26.

Since the two first ribs 26 and the two second ribs 27 are located between the top plate 211 of the shell 21 and the top cover body 281 of the sliding cover 28, when the two second ribs 27 bear against the corresponding two first ribs 26, an airtight space is formed to prevent dust from entering from the gap between the shell 21 and the sliding cover 28.

In addition, the above-mentioned sliding cover 28 has a left cover body 282 and a right cover body 283. The top cover body 281 is respectively connected to the left cover body 282 and the right cover body 283, the left cover body 282 covers the left sidewall 212 of the shell 21, and the right cover body 283 covers the right sidewall 213 of the shell 21.

Figures 4A, 4B:
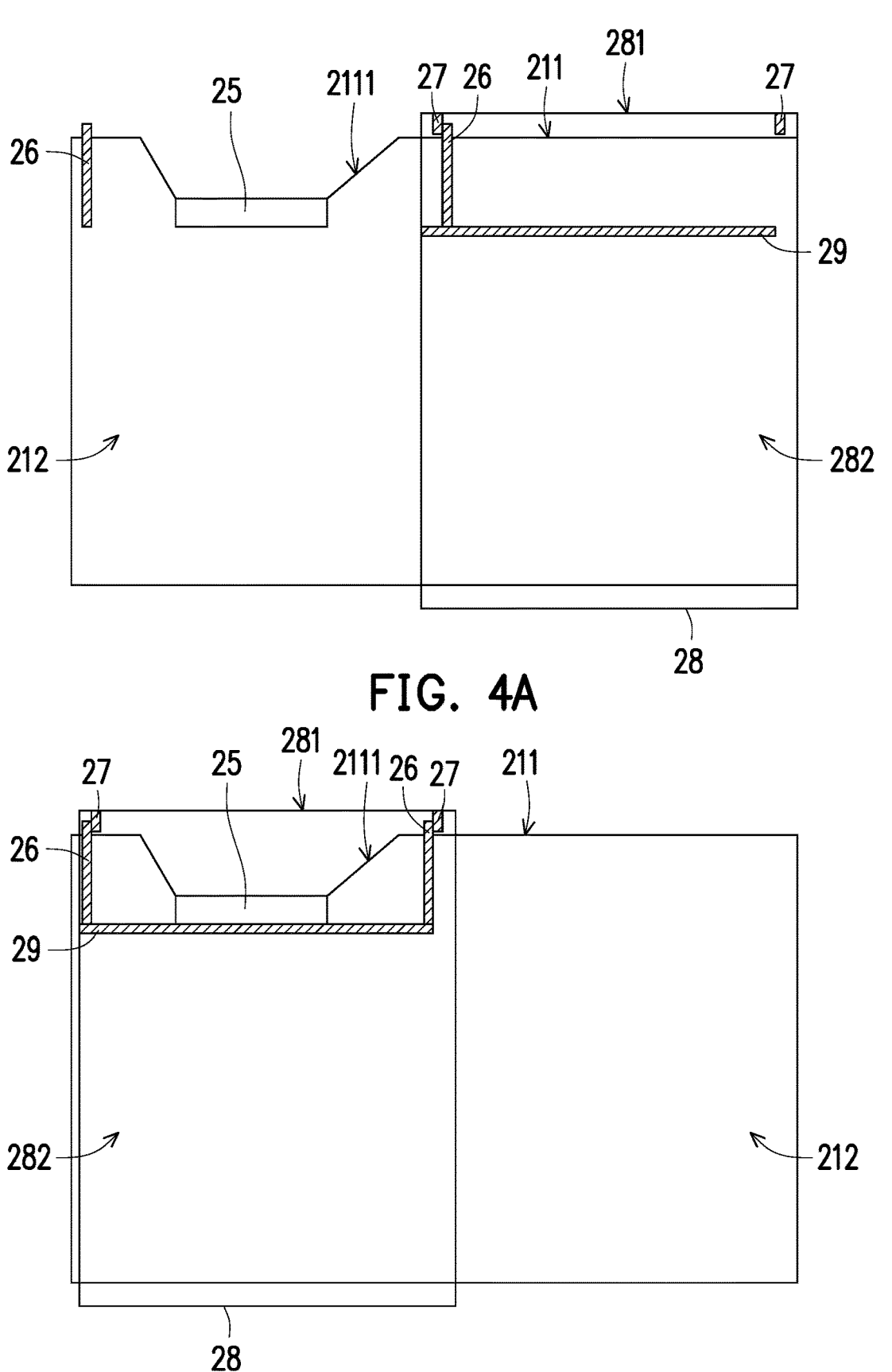
FIG. 4A is a side view of FIG. 3A.
FIG. 4B is a side view of FIG. 3B.

FIG. 4A is a side view of FIG. 3A, and FIG. 4B is a side view of FIG. 3B. Please refer to FIGS. 2, 3A, and 4A at the same time. The projection device 2 further includes two third ribs 29 respectively disposed on the left cover body 282 and the right cover body 283 of the sliding cover 28. One ends of the two first ribs 26 extend from a top wall to the left sidewall 212, and the other ends of the two first ribs 26 extend from the top wall to the right sidewall 213. The end of the first rib 26 extending to the sidewall is located between the sidewall and the cover body. Similarly, the third rib 29 is located between the cover body and the sidewall. It should be further described that the position of one of the third ribs 29 disposed on the right cover body 283 corresponds to the position of the other third rib 29 disposed on the left cover body 282.

Please refer to FIGS. 2, 3B, and 4B at the same time. When the sliding cover 28 is in the closed position, the third rib 29 of the left cover body 282 bears against the one ends of the two first ribs 26, the third rib 29 of the right cover body 283 bears against the the other ends of the two first ribs 26, and the left cover body 282, the right cover body 283, the top cover body 281, the two first ribs 26, the two second ribs 27, and the two third ribs 29 close the opening 2111 of the top plate 211. Through the end of the first rib 26 and the third rib 29 bearing against each other, dust may be prevented from entering from the gap between the left sidewall 212 and the right sidewall 213 of the shell 21 and the left cover body 282 and the right cover body 283 of the sliding cover 28.

In light of the above, when the sliding cover 28 is in the closed position, the sliding cover 28, the top plate 211 of the shell 21, the left sidewall 212 of the shell 21, the right sidewall 213 of the shell 21, the first ribs 26, the second ribs 27, and the third ribs 29 form a closed structure that can completely cover the opening 2111 to prevent dust from entering the inside of the shell 21 and affecting the operation of the internal elements of the projection device 2.

Figures 5A, 5B:
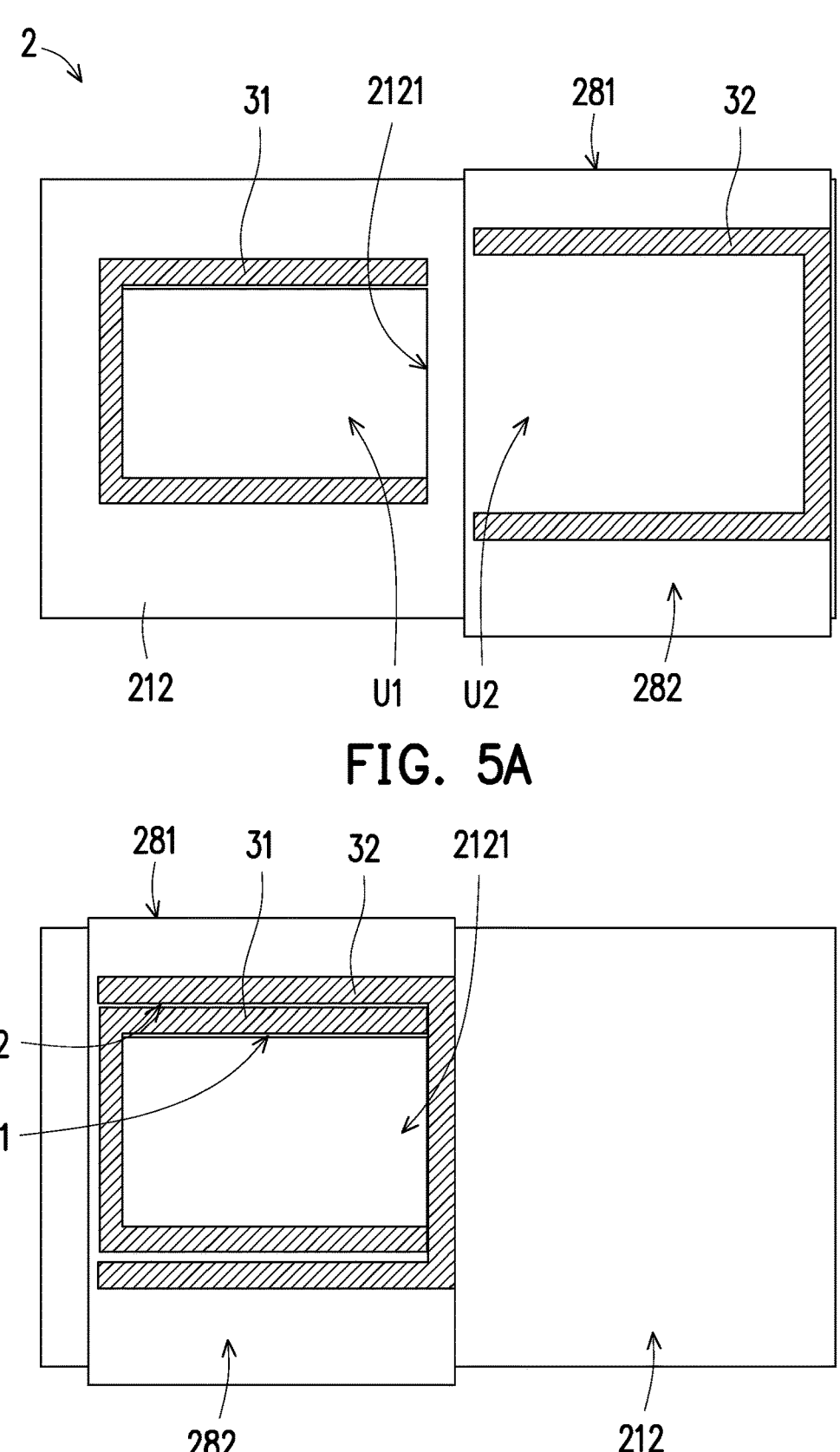
FIGS. 5A and 5B are schematic diagrams of provided ribs corresponding to the sliding cover and an air outlet area of the projection device.

FIGS. 5A and 5B are schematic diagrams of provided ribs corresponding to the sliding cover and an air outlet area of the projection device. As shown in FIG. 5A, the projection device 2 further includes two fifth ribs 31 and two sixth ribs 32. The two fifth ribs 31 are respectively disposed on the left sidewall 212 and the right sidewall 213. The left sidewall 212 has a first air opening 2121, and the fifth rib 31 of the left sidewall 212 surrounds the first air opening 2121. The right sidewall 213 has a second air opening 2131, and the fifth rib 31 of the right sidewall 213 surrounds the second air opening 2131. The two sixth ribs 32 are respectively disposed on the left cover body 282 and the right cover body 283. As shown in FIG. 5B, when the sliding cover 28 is in the closed position, the two sixth ribs 32 bear against the corresponding fifth ribs 31, respectively. Specifically, the two fifth ribs 31 and the two sixth ribs 32 are U-shaped, and an opening end U1 of the fifth rib 31 faces an opening end U2 of the sixth rib 32. Therefore, when the sliding cover 28 is in the closed position, each of the sixth ribs 32 surrounds the corresponding fifth rib 31, and the opening end U1 of each of the fifth ribs 31 bears against the corresponding sixth rib 32 to form a closed area. Therefore, the left cover body 282, the sixth rib 32 of the left cover body 282 and the fifth rib 31 of the left sidewall 212 close the first air opening 2121, and the right cover body 283, the sixth rib 32 of the right cover body 283 and the fifth rib 31 of the right sidewall 213 close the second air opening 2131. Referring to FIG. 2 together, the structural features of the first air opening 2121 and the second air opening 2131 are the same, and the technical features of the fifth rib 31 of the left sidewall 212 and the sixth rib 32 of the left cover body 282 closing the first air opening 2121 are the same as the technical features of the fifth rib 31 of the right sidewall 213 and the sixth rib 32 of the right cover body 283 closing the second air opening 2131. Thus, the schematic diagrams of the fifth rib 31 of the right sidewall 213 and the sixth rib 32 of the right cover body 283 are not separately shown.

It should be further described that, when the fan module 24 is in operation, the flow direction of the airflow may be adjusted according to actual needs. For example, the first air opening 2121 may be configured as an air inlet, and the second air opening 2131 may be configured as an air outlet, but not limited thereto.

The first rib 26, the second rib 27, the third rib 29, the fifth rib 31, and the sixth rib 32 mentioned above adopt elastic and low-porosity materials, such as rubber strips.

Figure 5C:
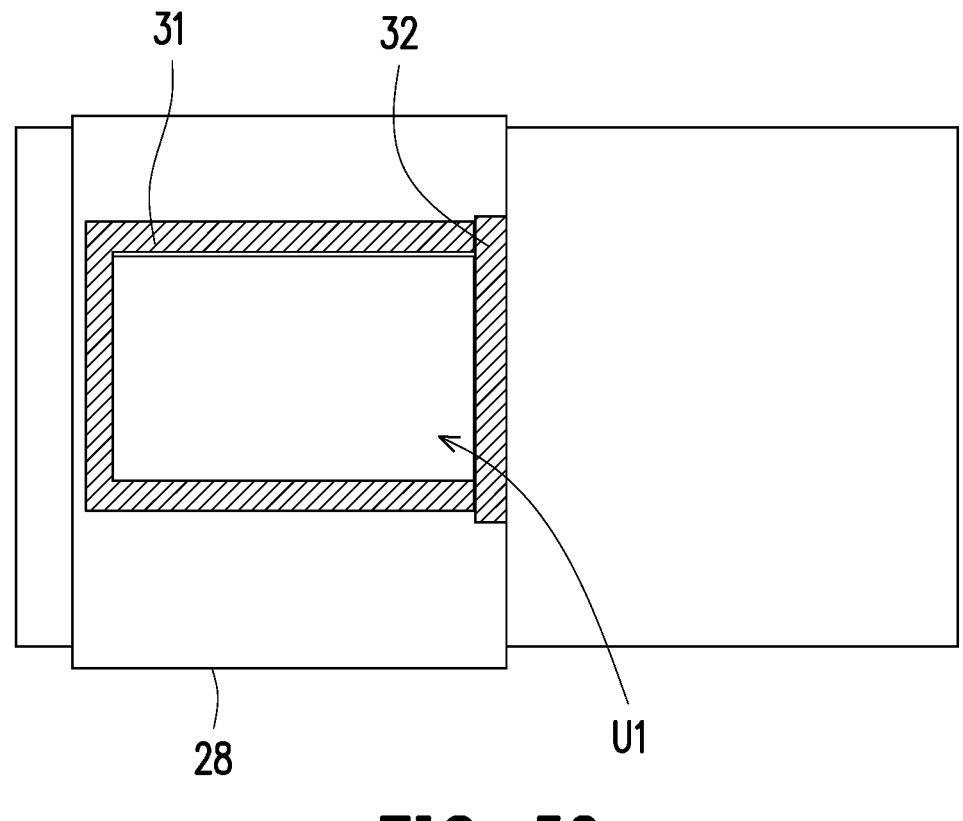
FIG. 5C is a schematic diagram of another embodiment of the fifth ribs and the sixth ribs.

It should be noted that, as shown in FIG. 5C, alternatively, the fifth rib 31 may be a U-shaped structure, and the sixth rib 32 may be an I-shaped structure. When the sliding cover 28 is in the closed position, the opening end U1 of the fifth rib 31 bears against the corresponding sixth rib 32 to form a closed area.

Figure 6:
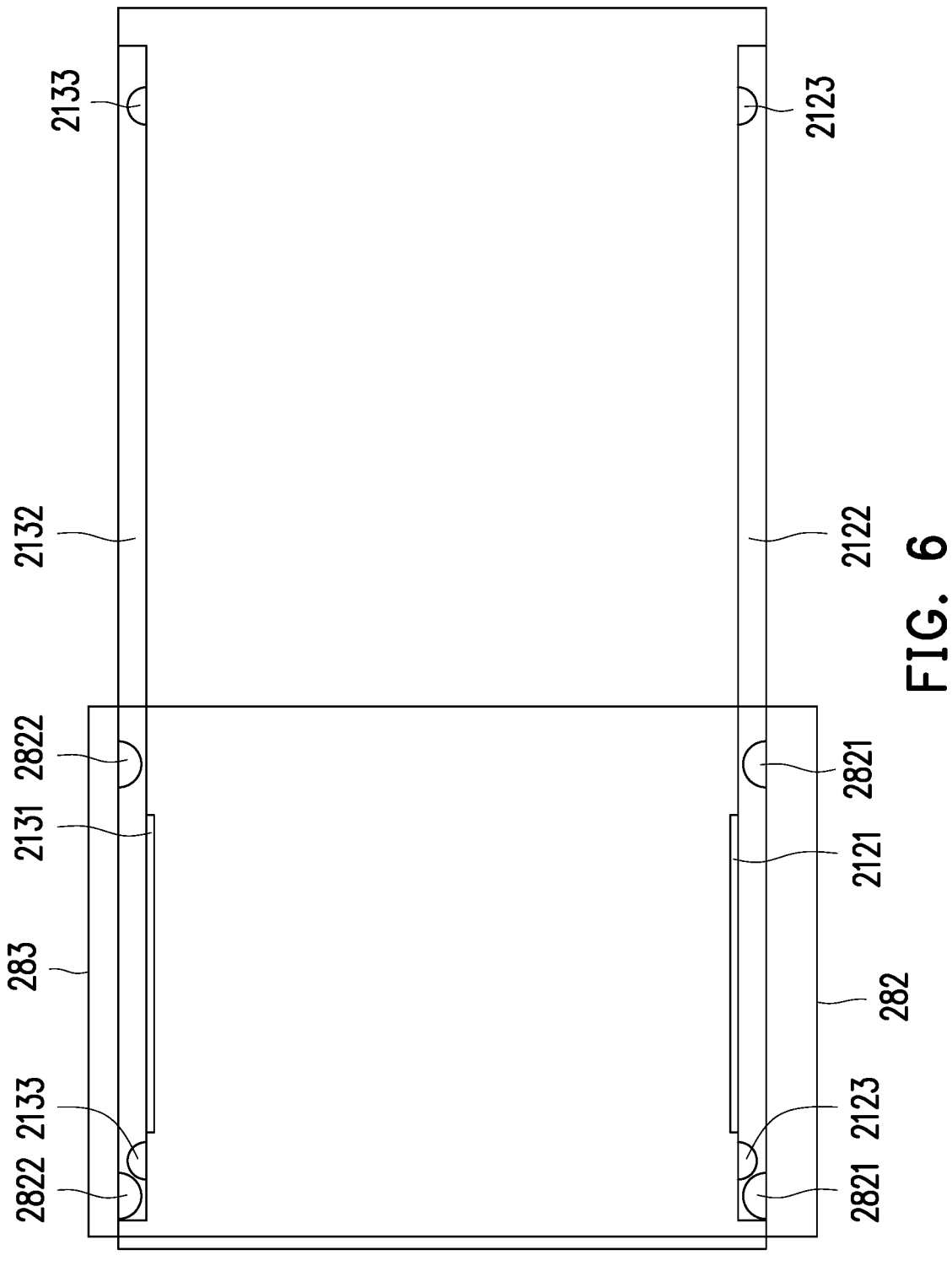
FIG. 6 is a schematic view of the fitting of the cover body of the sliding cover and the sidewalls of the shell.

FIG. 6 is a schematic view of the fitting of the cover body of the sliding cover and the sidewalls of the shell. The left cover body 282 has two first convex points 2821, and the right cover body 283 has two second convex points 2822. The left sidewall 212 has a first sliding portion 2122, and the two first convex points 2821 are embedded into the first sliding portion 2122. The right sidewall 213 has a second sliding portion 2132, and the two second convex points 2822 are embedded in the second sliding portion 2132.

The sliding cover 28 can slide smoothly relative to the shell 21 by embedding the above-mentioned convex points into the corresponding sliding portions.

The above-mentioned sliding portion is a slide rail, and the slide rail may be a structure integrally formed on the sidewall of the shell 21 when the shell 21 is formed, or may be a structure assembled to the shell 21 separately. In the case that the slide rail is a structure assembled to the shell 21 separately, the material of the slide rail may adopt metal, which is different from the material of the shell 21 made of plastic.

In addition, the first sliding portion 2122 has two third convex points 2123, and the two third convex points 2123 are respectively disposed at two ends of the first sliding portion 2122. The second sliding portion 2132 has two fourth convex points 2133, and the two fourth convex points 2133 are respectively disposed at two ends of the second sliding portion 2132.

Figures 7A, 7B:
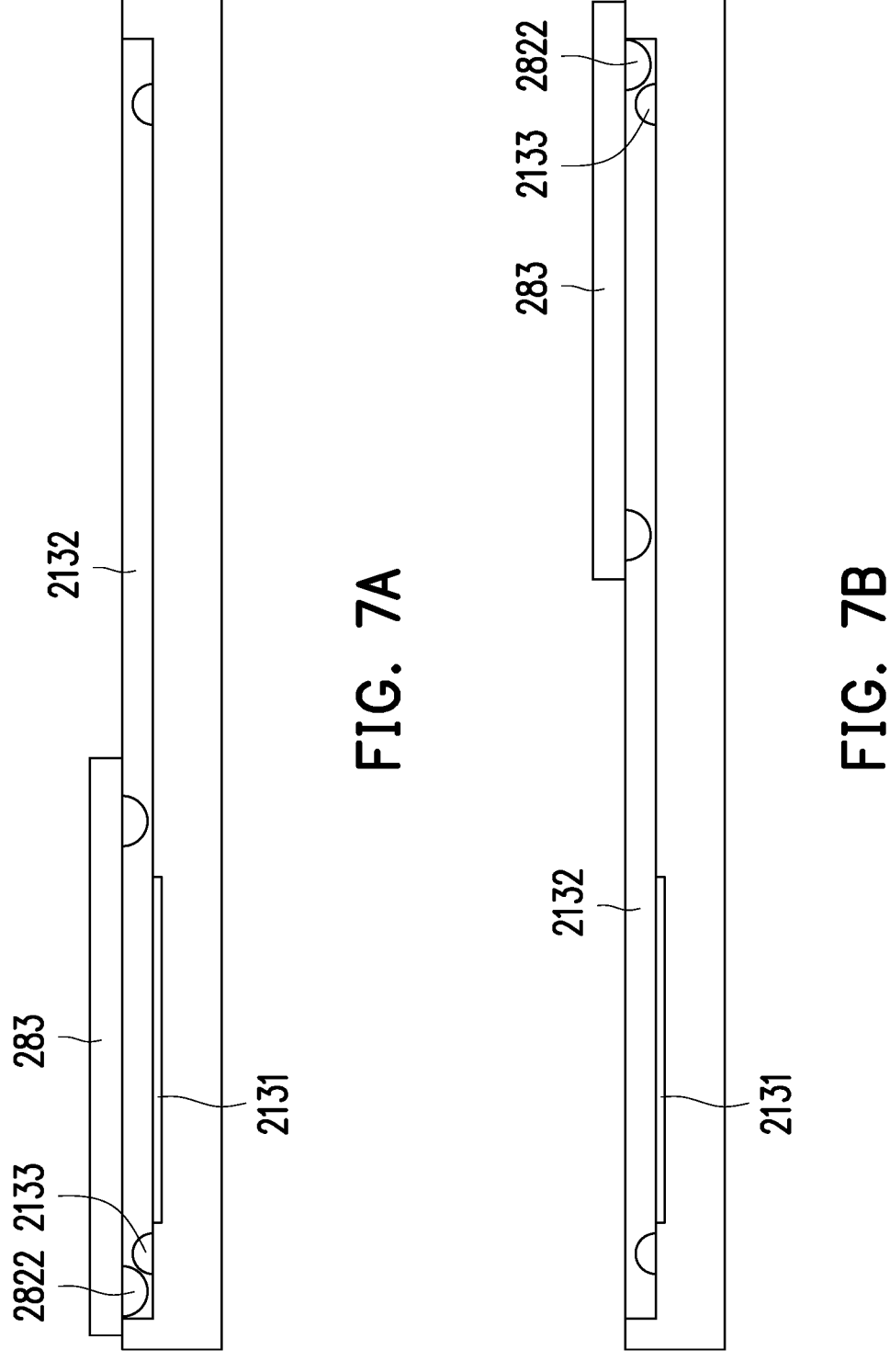
FIGS. 7A and 7B are schematic diagrams of the convex points on the cover body and the convex points on the sidewall.

FIGS. 7A and 7B are schematic diagrams of the convex points on the cover body and the convex points on the sidewall. Please refer to FIGS. 6 and 7A at the same time. When the sliding cover 28 is in the closed position, one of the first convex points 2821 of the left cover body 282 is fastened to one of the third convex points 2123 of the first sliding portion 2122, and one of the second convex points 2822 of the right cover body 283 is fastened to one of the fourth convex points 2133 of the second sliding portion 2132. Please refer to FIGS. 6 and 7B at the same time. When the sliding cover 28 is in the open position, the other first convex point 2821 of the left cover body 282 is fastened to the other third convex point 2123 of the first sliding portion 2122, and the other second convex point 2822 of the right cover body 283 is fastened to the other fourth convex point 2133 of the second sliding portion 2132. It should be further described that FIGS. 7A and 7B show the technical feature that the second convex point 2822 of the right cover body 283 may be engaged with the fourth convex point 2133 of the second sliding portion 2132, which is the same as the technical feature that the first convex point 2821 of the left cover body 282 may be engaged with the third convex point 2123 of the first sliding portion 2122, and thus figures are not shown separately.

The position of the sliding cover 28 relative to the shell 21 can be limited by the interference formed between the third convex point 2123 and the fourth convex point 2133 and the corresponding first convex point 2821 and second convex point 2822.

Figures 8A, 8B:
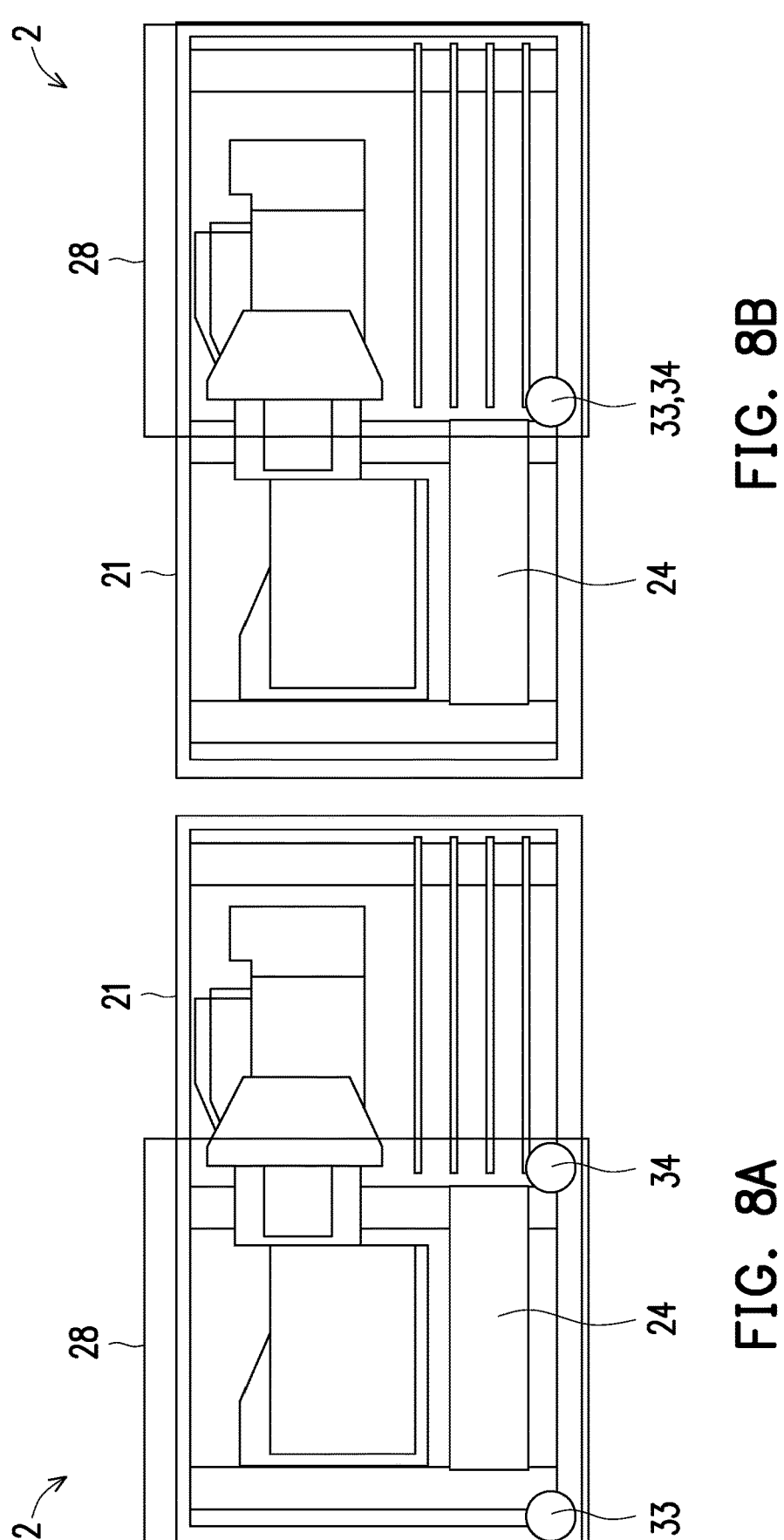
FIG. 8A is a schematic diagram of the projection device provided with sensors and the sliding cover in the closed position.
FIG. 8B is a schematic diagram of the projection device provided with sensors and the sliding cover in the open position.

FIG. 8A is a schematic diagram of the projection device provided with sensors and the sliding cover in the closed position. FIG. 8B is a schematic diagram of the projection device provided with sensors and the sliding cover is in the open position. Please refer to FIGS. 2, 8A, and 8B at the same time. The projection device 2 further includes a first sensor 33 and a second sensor 34. The first sensor 33 is disposed on the left cover body 282 or the right cover body 283, and the second sensor 34 is disposed on the left sidewall 212 or the right sidewall 213. The first sensor 33 and the second sensor 34 are located on the same side of the shell 21, and the first sensor 33, the second sensor 34 or a combination thereof is connected to the fan module 24 inside the shell 21. As shown in FIG. 8A, when the sliding cover 28 is in the closed position, the first sensor 33 and the second sensor 34 do not coincide with each other, and the fan module 24 is in a turned-off state; as shown in FIG. 8B, when the sliding cover 28 is in the open position, the first sensor 33 and the second sensor 34 coincide and activate the fan module 24.

Specifically, in order to ensure that the effect of the opening 2111 covered by the sliding cover 28 does not cause the backflow of the cooling flow field due to being covered by the sliding cover 28, and allows dust to easily accumulate inside the shell 21, corresponding sensors are disposed on the left cover body 282 or the right cover body 283 of the sliding cover 28 and the left sidewall 212 or the right sidewall 213 of the shell 21. When the first sensor 33 and the second sensor 34 coincide with each other, which means that the opening 2111 is not covered, at this time, the fan module 24 is activated to provide an active flow field.

The above-mentioned sensor may adopt an electrome-chanical contact device, such as a contact interlock switch. When the first sensor 33 and the second sensor 34 coincide with each other, one of the sensors presses the switch of the other sensor, and notifies the system of message feedback to activate the fan module 24.

Alternatively, the sensor may adopt an induction device, such as a magnetic induction type or a light induction type. When the sensor is a magnetic induction type device, the fan module 24 can only be turned on after detecting that the magnetic field strength is greater than a certain value; when the sensor is a light induction type device, the fan module 24 is not turned on until the receiving end receives a specific spectrum from the transmitting end.

The above-mentioned several different types of sensors are merely for illustration, and are not intended to limit the types of sensors.

Figure 8C:
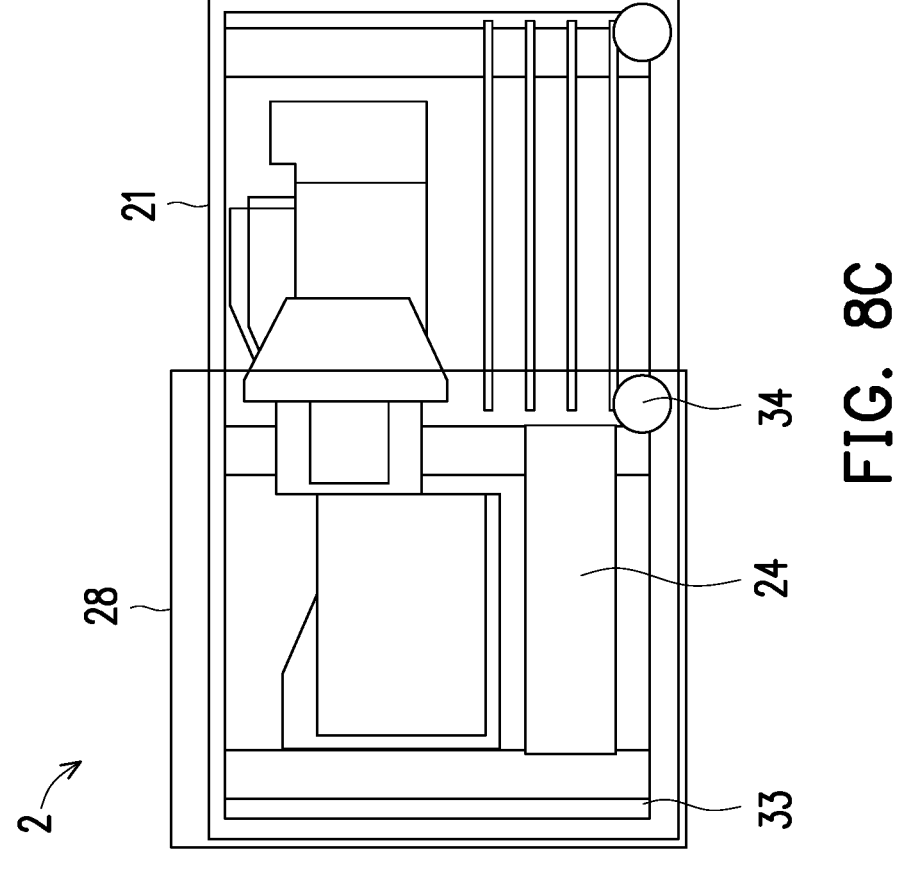
FIG. 8C is a schematic diagram of different positions of the sensors.

FIG. 8C is a schematic diagram of different positions of the sensors. From FIGS. 8A to 8C, it can be seen that under the situation where the effects that the first sensor 33 and the second sensor 34 can bring are not affected, the positions of the first sensor 33 and the second sensor 34 may be changed according to requirements.

Figure 9A:
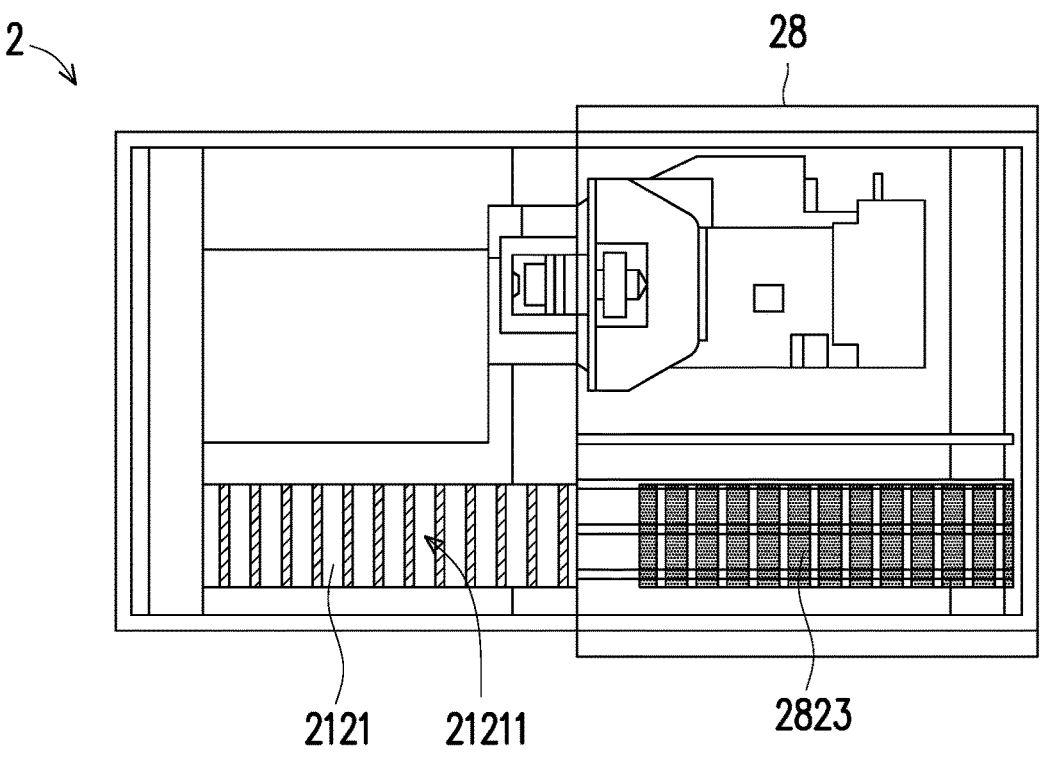
FIGS. 9A and 9B are schematic diagrams of the left sidewall having air holes and the cover body having a fence structure.
Figure 9B:
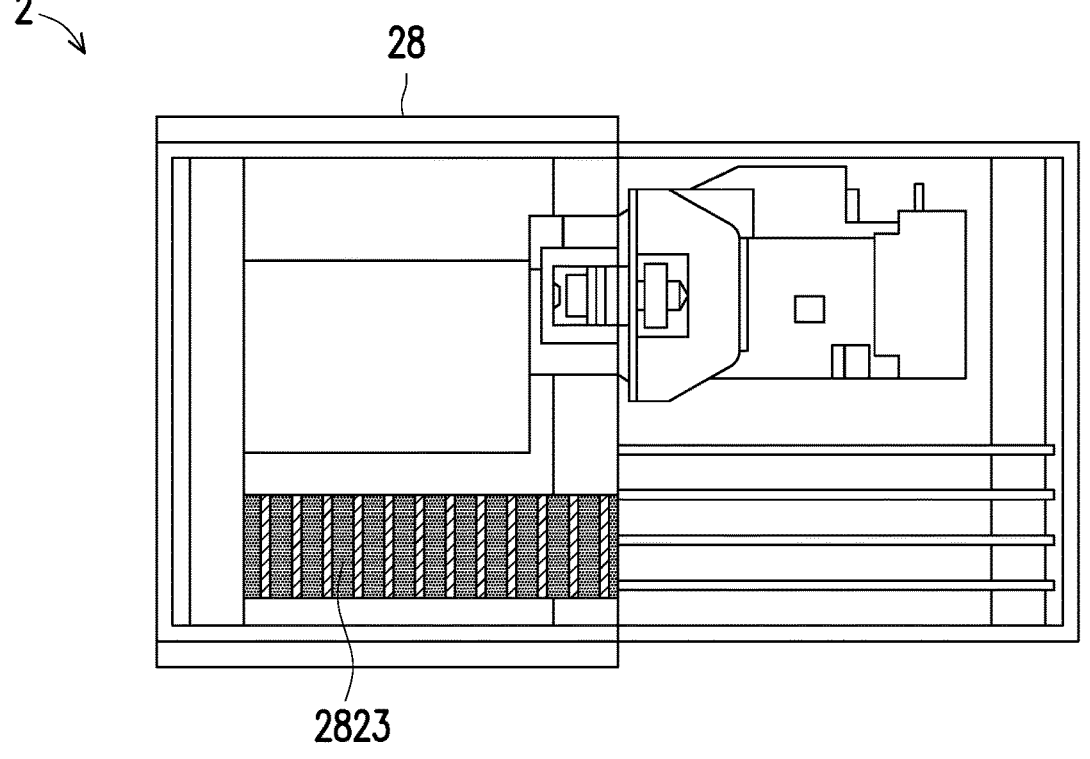
Figure 9C:
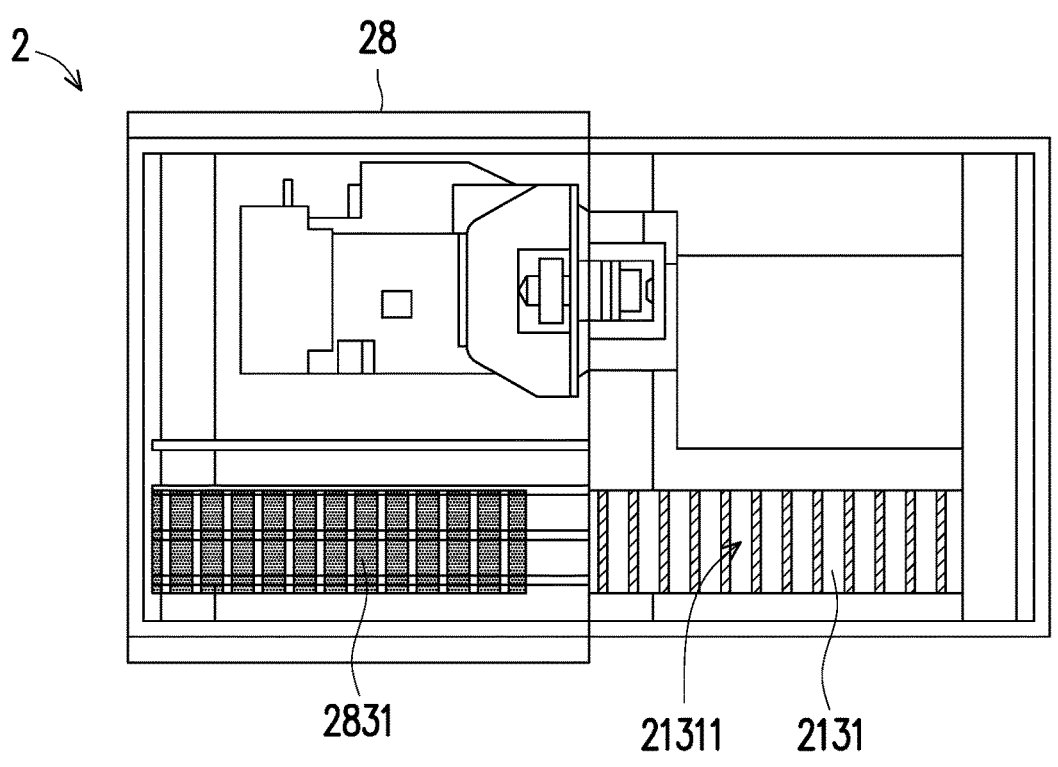
FIGS. 9C and 9D are schematic diagrams of the right sidewall having air holes and the cover body having a fence structure.
Figure 9D:
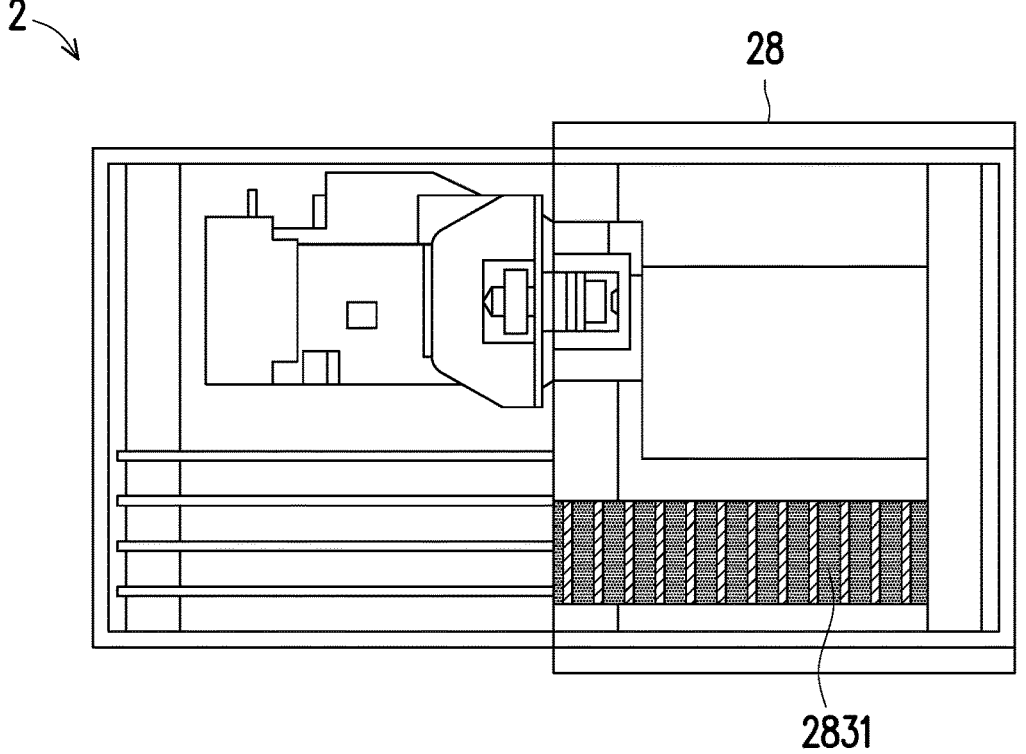

FIGS. 9A and 9B are schematic diagrams of the left sidewall having air holes and the cover body having a fence structure. FIGS. 9C and 9D are schematic diagrams of the right sidewall having air holes and the cover body having a fence structure. Please refer to FIGS. 2, 9A, 9B, 9C, and 9D at the same time. The sliding cover 28 may be a discontinuous structure without holes. Specifically, the area where the sliding cover 28 corresponds to the first air opening 2121 and the second air opening 2131 may be disposed as a fence structure.

In detail, the first air opening 2121 of the left sidewall 212 has multiple first air holes 21211, and the left cover body 282 has a first fence structure 2823. The second air opening 2131 of the right sidewall 213 has multiple second air holes 21311, and the right cover body 283 has a second fence structure 2831.

As shown in FIGS. 9A and 9C, when the sliding cover 28 is in the open position, the first fence structure 2823 exposes the first air holes 21211, and the second fence structure 2831 exposes the second air holes 21311; as shown in FIGS. 9B and 9D, when the sliding cover 28 is in the closed position, the first fence structure 2823 covers the first air holes 21211, the second fence structure 2831 covers the second air holes 21311, and the fence structure completely covers and blocks the range of the air holes.

To sum up, in the projection device of the disclosure, as the sliding cover is slidably disposed on the shell, when the lens needs to be used, the sliding cover may be slid along the shell to expose the opening of the top plate of the shell, so that the projection device can project images; when the lens needs not be used, the sliding cover is slid along the shell to cover the opening, so as to prevent dust fall from accumulating on the lens.

In addition, the ribs corresponding to each other are disposed on the surfaces of the sliding cover and the shell facing each other. When the sliding cover is in the closed position, a closed space is formed by the cover body of the sliding cover, the top plate of the shell, the left sidewall of the shell, the right sidewall of the shell, and the ribs that bear against each other, thereby achieving the effect of preventing dust fall from entering the inside of the shell.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A projection device, comprising: a shell, a lens, two first ribs, two second ribs, and a sliding cover; wherein the shell has a top plate, a left sidewall, and a right sidewall, the top plate is respectively connected to the left sidewall and the right sidewall, and the top plate has an opening;

the lens is disposed in the shell and exposed by the opening;

the two first ribs are disposed on the top plate, extending directions of the two first ribs are perpendicular to the left sidewall and the right sidewall, and the opening is disposed between the two first ribs;

the sliding cover is slidably disposed on the shell and configured to cover the opening; and the two second ribs are disposed on a top cover body of the sliding cover, and one of the two second ribs is located between the two first ribs;

wherein the sliding cover is configured to slide relative to the shell, when the sliding cover is at an open position, the top cover body does not cover the lens, and when the sliding cover is at a closed position, the top cover body covers the lens, and the two second ribs bear against the two first ribs corresponding to thereof.

2. The projection device according to claim 1, wherein the sliding cover has a left cover body and a right cover body, the top cover body is respectively connected to the left cover body and the right cover body, and the left cover body covers the left sidewall of the shell, and the right cover body covers the right sidewall of the shell.

3. The projection device according to claim 2, further comprising: two third ribs, respectively disposed on the left cover body and the right cover body of the sliding cover, one ends of the two first ribs extending from a top wall to the left sidewall, and the other ends of the two first ribs extending from the top wall to the right sidewall, when the sliding cover is at the closed position, the third rib of the left cover body bears against the one ends of the two first ribs, the third rib of the right cover body bears against the other ends of the two first ribs, and the left cover body, the right cover body, the top cover body, the two first ribs, the two second ribs, and the two third ribs close the opening of the top plate.

4. The projection device according to claim 2, further comprising: two fifth ribs and two sixth ribs, wherein the two fifth ribs are respectively disposed on the left sidewall and the right sidewall, the left sidewall has a first air opening, the fifth rib of the left sidewall surrounds the first air opening, the right sidewall has a second air opening, the fifth rib of the right sidewall surrounds the second air opening, and the two sixth ribs are respectively disposed on the left cover body and the right cover body, when the sliding cover is at the closed position, the two sixth ribs respectively bear against the fifth ribs corresponding to thereof, and the left cover body, the sixth rib of the left cover body, and the fifth rib of the left sidewall close the first air opening, and the right cover body, the sixth rib of the right cover body, and the fifth rib of the right sidewall close the second air opening.

5. The projection device according to claim 4, wherein the two fifth ribs and the two sixth ribs are U-shaped structures, and when the sliding cover is at the closed position, each of the sixth ribs surrounds the fifth rib corresponding to thereof, and an opening end of each of the fifth ribs bears against the sixth rib corresponding to thereof.

6. The projection device according to claim 4, wherein the two fifth ribs are U-shaped structures, and when the sliding cover is at the closed position, an opening end of each of the fifth ribs bears against the sixth rib corresponding to thereof.

7. The projection device according to claim 2, wherein the left cover body has two first convex points, the right cover body has two second convex points, the left sidewall has a first sliding portion, the two first convex points are embedded in the first sliding portion, the right sidewall has a second sliding portion, and the two second convex points are embedded in the second sliding portion.

8. The projection device according to claim 7, wherein the first sliding portion has two third convex points, the two third convex points are respectively disposed at two ends of the first sliding portion, the second sliding portion has two fourth convex points, and the two fourth convex points are respectively disposed at two ends of the second sliding portion, when the sliding cover is at the closed position, one of the first convex points is fastened to one of the third convex points, and one of the second convex points is fastened to one of the fourth convex points, when the sliding cover is at the open position, the other first convex point is fastened to the other third convex point, and the other second convex point is fastened to the other fourth convex point.

9. The projection device according to claim 2, further comprising: a first sensor and a second sensor, the first sensor being disposed on the left cover body or the right cover body, the second sensor being disposed on the left sidewall or the right sidewall, the first sensor and the second sensor being located on the same side of the shell, and the first sensor, the second sensor or a combination thereof being connected to the fan module in the shell, and when the sliding cover is at the open position, the first sensor and the second sensor coincide and activate the fan module.

10. The projection device according to claim 2, wherein, the left sidewall has a first air opening, the first air opening has a plurality of first air holes, and the left cover body has a first fence structure, the right sidewall has a second air opening, the second air opening has a plurality of second air holes, and the right cover body has a second fence structure, and when the sliding cover is at the closed position, the first fence structure covers the plurality of first air holes, and the second fence structure covers the plurality of second air holes.

* * * * *